United States Patent [19]

Morris, Sr.

[11] 4,215,586

[45] Aug. 5, 1980

[54] TRUCK TRANSMISSION WITH POWER TAKE-OFF

[76] Inventor: Charles M. Morris, Sr., Box 605, View, Tex. 79564

[21] Appl. No.: 8,283

[22] Filed: Feb. 1, 1979

[51] Int. Cl.² .......................... F16H 37/00; F16H 3/08
[52] U.S. Cl. ...................................... 74/15.2; 74/15.4; 74/15.66; 74/360
[58] Field of Search ................. 180/53 D; 74/15.66, 74/11, 15.2, 15.4, 15.6, 15.8, 360, 329

[56] References Cited

U.S. PATENT DOCUMENTS

| | | | |
|---|---|---|---|
| 1,876,561 | 4/1932 | Brown | 74/15.4 |
| 2,034,778 | 3/1936 | Storey | 74/15.2 |
| 2,168,033 | 8/1939 | Johnston et al. | 74/15.2 |
| 2,203,282 | 6/1940 | Keese | 74/15.66 |
| 2,352,270 | 6/1944 | Land et al. | 74/15.6 X |
| 2,548,182 | 4/1951 | Wagner | 74/15.2 |
| 2,636,390 | 4/1953 | Wagner | 74/15.2 |
| 2,716,347 | 8/1955 | Bottorff | 74/15.6 |
| 2,731,838 | 1/1956 | Wagner | 74/15.2 |
| 2,838,940 | 6/1958 | Swenson et al. | 74/15.2 |
| 3,011,353 | 12/1961 | Friedrich et al. | 74/15.8 |
| 3,040,588 | 6/1962 | Hausmann et al. | 74/15.2 X |
| 3,046,813 | 7/1962 | Bixby | 74/15.66 X |
| 3,074,285 | 1/1963 | Hausmann | 74/15.2 |
| 3,204,468 | 9/1965 | Ruoff | 74/15.2 X |
| 3,727,479 | 4/1973 | Wilson | 74/360 X |
| 3,753,376 | 8/1973 | Ribeiro | 74/15.2 |

FOREIGN PATENT DOCUMENTS

| | | | |
|---|---|---|---|
| 1068049 | 10/1959 | Fed. Rep. of Germany | 74/15.2 |
| 1182922 | 12/1964 | Fed. Rep. of Germany | 74/15.6 |
| 1153249 | 3/1958 | France | 74/360 |
| 2345629 | 10/1977 | France | 74/15.4 |
| 912109 | 12/1962 | United Kingdom | 74/15.2 |

*Primary Examiner*—Leslie Braun
*Attorney, Agent, or Firm*—Wendell Coffee

[57] ABSTRACT

A two speed auxiliary truck transmission utilizes two counter shafts. Two power take-off shafts, which are double ended (i.e., each power take-off shaft extends forward and rearward) are meshed to the gears on the main shaft and counter shaft. In this way, each of the power take-off shafts may be driven forward or rearward independently of the other power take-off shaft and whether the main shaft is in direct drive or underdrive, or in neutral. Likewise, the operation of the main drive shaft is independent of whether either of the power take-off shafts is reverse or neutral.

6 Claims, 4 Drawing Figures

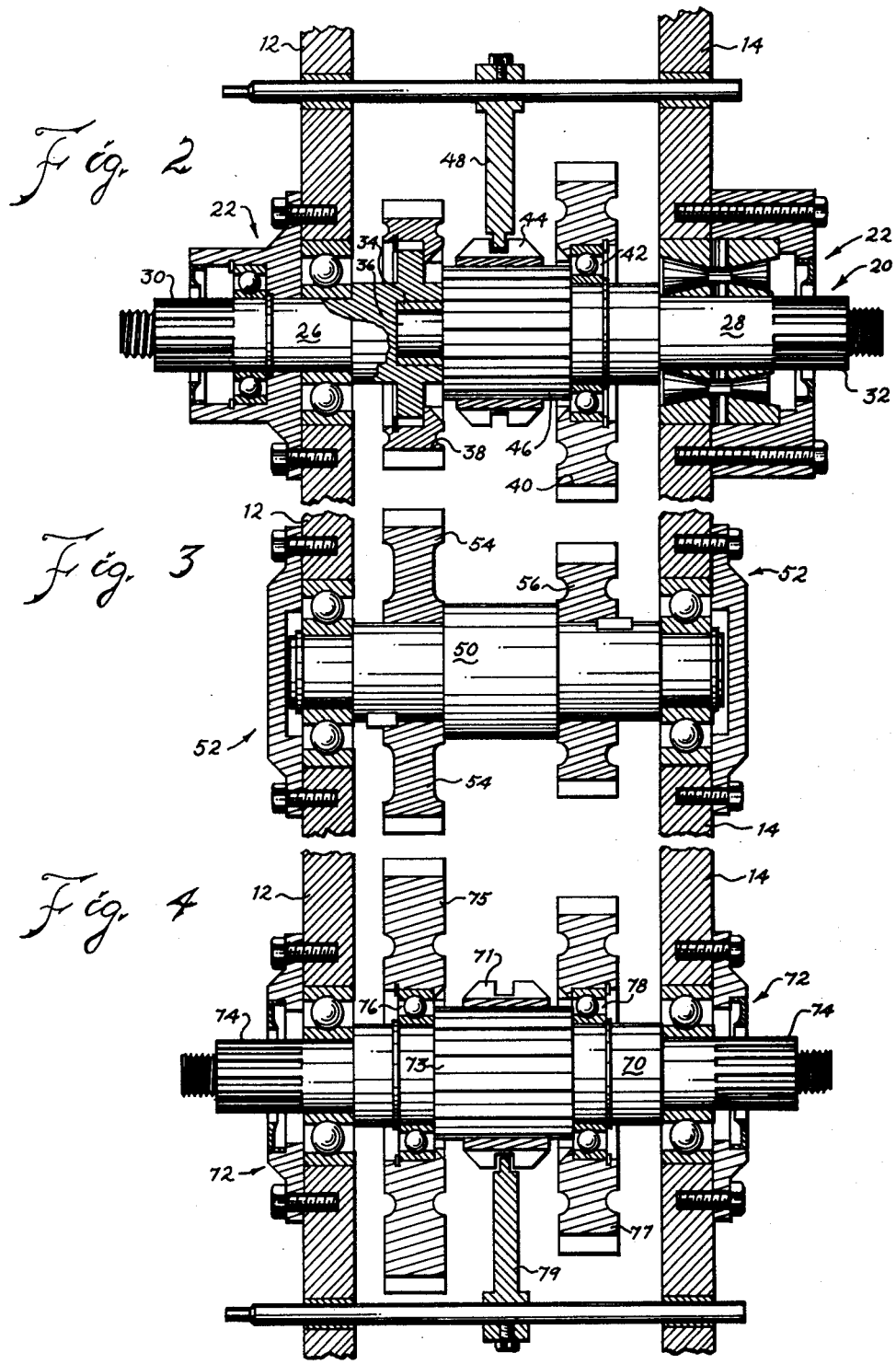

TRUCK TRANSMISSION WITH POWER TAKE-OFF

CROSS REFERENCE TO RELATED APPLICATIONS

None. However, applicant filed Disclosure Document No. 075011 on Oct. 16, 1978, which document concerns this application; therefore, by separate letter, it is respectfully requested that the document be retained and acknowledgement thereof made by the Examiner. (MoPEP 1706).

BACKGROUND OF THE INVENTION (1) Field of the Invention

This invention relates to machine elements and mechanism and more particularly to a transmission with plural power take-off shafts.

(2) Description of the Prior Art

Heavy duty trucks often have multiple transmission boxes. I.e., a main transmission box is located immediately behind the clutch which is on the engine itself. This is in addition to a two speed differential located at the driving axle. Further, it is not uncommon for a power take-off shaft to be attached to the drive train at some point, often at an auxiliary transmission. There is need for the power take-off shafts for operating items such as pumps and winches. A great number of different arrangements of power take-off shafts have been provided with different driving arrangements for them.

Before this invention was filed, the applicant caused a search to be made in the United States Patent and Trademark Office and the following references were found, none of which are considered to be particularly pertinent to applicant's invention as presented here. The prior U.S. Pat. Nos. found in the search are as follows: Wagner 2,548,182; Wagner 2,636,390; Wagner 2,731,838; Swenson 2,838,940; Storey 2,034,778; Johnston 2,168,033; Land 2,352,270.

SUMMARY OF THE INVENTION

New and Different Function

I have invented a transmission with two power take-off shafts which are mounted in a single compact auxiliary housing. All of the shafts extend through the front and rear wall of the housing thereby giving a particular rugged construction capable of transmitting high torques and horsepower. In addition, each of the power take-off shafts are double ended, i.e., each extend forward of the power take-off housing and rearward of the power take-off housing. Inasmuch as often in the rigging or attaching of pumps, winch drives and the like, this is particularly desirable inasmuch as the structural location of this equipment makes it more desirable to have the power take-off shaft extend from the front of the auxillary housing or the back of it. Each of the shafts is driven alternately from the gears on the main drive or on the counter shaft and, therefore, each of the power take-off shafts may be driven either forward or rearward.

Inasmuch as the counter shafts are always rotating and also the gears on the main shaft are always rotating the operation of each of the power take-off shafts is independent of the operation of the auxiliary transmission, I.e., either of the power take-off shafts may be driven forward, reverse or be in neutral, irregardless of the position of the other power take-off shaft and also irregardless of whether the auxiliary transmission is in direct drive, underdrive or neutral.

Thus it may be seen that the total function of this invention far exceeds the sum of the functions of the individual elements such as gears, shafts, slides, spines, etc.

Objects of this Invention

An object of this invention is to provide power take-off shafts for truck auxiliary transmission.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 2 is a sectional view showing the main shaft.

FIG. 3 is a sectional view of one of the counter shafts.

FIG. 4 is a sectional view of one of the power take-off shafts.

DESCRIPTION OF THE PREFERRED EMBODIMENT

Figure 1:
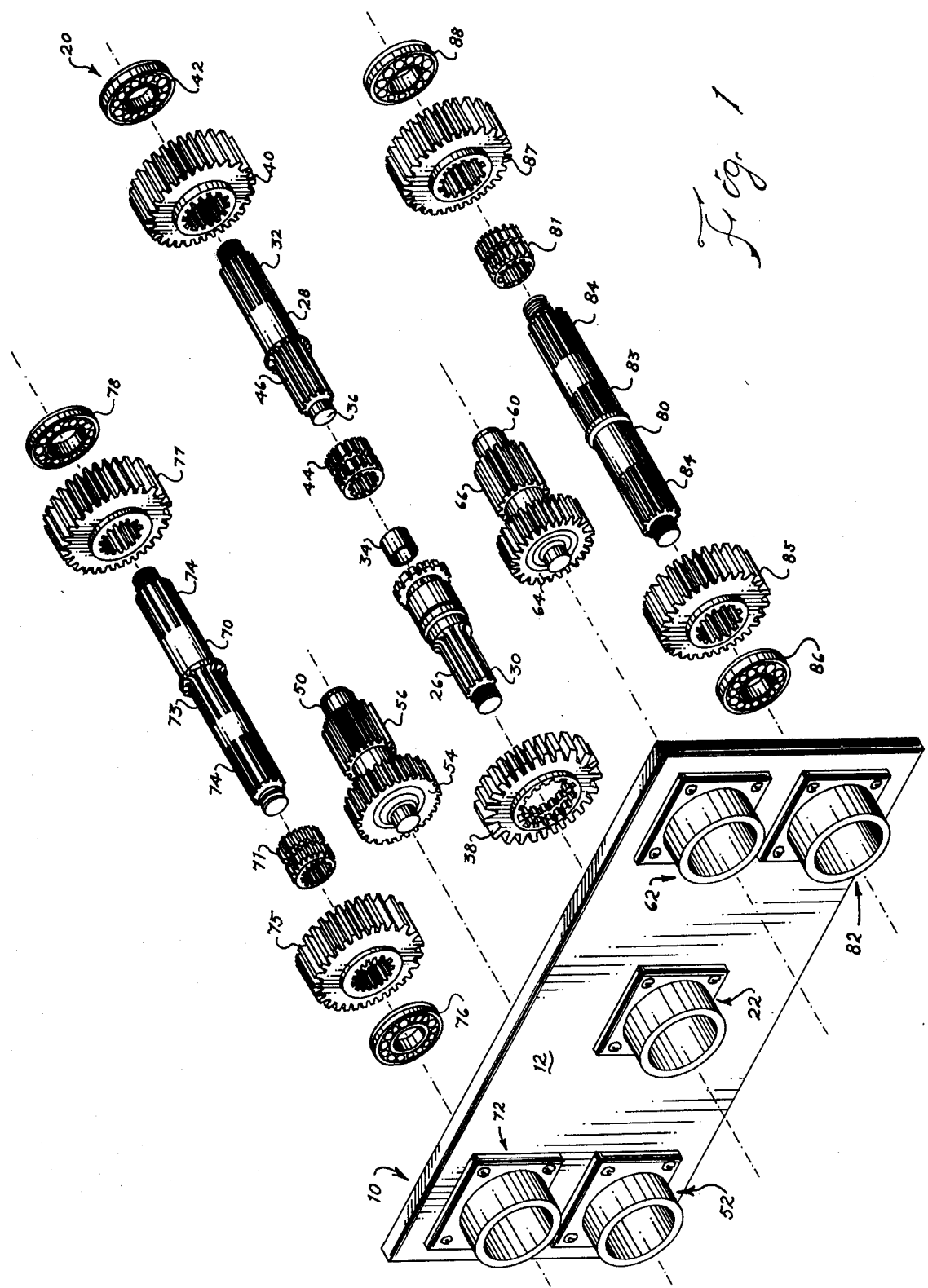
FIG. 1 is an exploded perspective view of a transmission according to my invention. Many bearings, lock rings and etc. have been omitted for clarity of illustration.

As used in this description, the term "pto" is used herein to stand for power take-off.

The auxiliary transmission includes housing 10. The housing has front end plate 12 and rear end plate 14 and is of conventional construction. Main shaft 20 extends through central hole in the front and rear end plates 12 and 14. The main shaft is journalled in suitable housing bearings 22 to the front and rear end plates.

The main shaft 20 is in two sections, a front main shaft 26 and rear main shaft 28. Front spline 30 at the front of the front main shaft provides means for attaching it to a suitable mechanisms to connect it to the main transmission or to any other source of power input to the gear box. Likewise back spline 32 on the rear of the rear shaft 28 provide means of coupling the power from the gear box into any other suitable point. The rear of the front main shaft 26 is bored to receive bushing 34 and stub 36. The stub 36 being upon the front of the rear main shaft 28. Therefore, it may be seen that although the front main shaft 26 and rear main shaft 28 may rotate separately, they will always be maintained coaxially.

Front main gear 38 is attached by suitable splines or other means so that it is rigidly attached to the front main shaft 26. Rear main gear 40 is attached by rear main bearing 42 to the rear main shaft 28. Main sleeve 44 is mounted upon main splines 46 and is actuated by main shifter 48. The splines 46 are in the rear main shaft 28. As may readily be seen and is conventional in the transmission arts, if the main sleeve 44 is forward it will connect the front main gear 38 to the rear main shaft 28 so that in this position there is a direct drive from the front main shaft 26 to the rear main shaft 28. As will be more fully explained later on, the rear main gear 40 will be rotating upon the rear main shaft 28 as provided by the rear main bearing 42. On the other hand, if the shifter 48 is moved so that the sleeve 44 is of the rearward position, the rear main shaft 28 would be coupled with the rear main gear 40 and it would be driven in an underdrive operating mode.

Counter shaft 50 journalled between the front and rear end plates 12 and 14 by suitable housing bearings 52. Front counter shaft gear 54 meshes with the front main gear 38 and rear counter shaft gear 56 meshes with rear main gear 40. Each of the gears 54 and 56 are attached as by keys to the counter shaft 50.

Likewise, counter shaft 60 is journalled to the housing by housing bearing 62 and the front counter shaft gear 64 meshes with the front main gear 38 and rear counter shaft gear 66 meshes with rear main gear 40.

It is again emphasized that the drawings are not scale drawings and the gears are not necessarily the diameter shown. Also, the placement and spacing of the housing bearings may not be as illustrated.

Basically, the mechanism described to this point is a standard two counter shaft auxiliary truck transmission. Truck transmissions of this nature without any pto shafts therewith have been known before my invention.

Pto Shaft 70 is journalled through the front and rear end plates 12 and 14 by suitable housing bearings 72. Both the front and rear of the pto shaft 70 is splined at 74 to attaching suitable output shafts thereto. Those skilled in the art will understand that if no suitable output is attached to either the front or the rear or both that the end of the shaft, protruding from the housing 10, may be capped by suitable protective caps. Front pto gear is journalled to the pto shaft by front pro bearing 76. Likewise, rear pto gear 77 is journalled to the pto shaft by rear pto bearing 78. Pto sleeve 71 is mounted for reciprocation upon the pto splines 73 on the pto shaft 70. Pto shifter 79 provides means for shifting the pto sleeve 71 to either engage the front pto gear 75 or the rear pto gear 77.

Front pto gear 75 is meshed with front counter shaft gear 54. However, the arrangement of the shafts and the gear sizes is such that front pto gear 75 clears and does not mesh or interfere with front main gear 38. Rear pto gear 77 meshes with the rear main gear 40. The placement of the shafts and the arrangement of the shafts as well as the size of the gears are such that the rear pto gear 77 clears and does not interfere with the rear counter shaft gear 56.

Therefore, analysis will readily show that the front pto gear 75 is rotating in the same direction as the front main shaft gear 38 and, thus, the front main shaft 26. However, the rear pto gear 77 is rotating in the opposite direction as the main shaft 20. Therefore if the pto shifter 79 is moved to move the pto sleeve 71 in engagement with the front pto gear 75, it will cause the pto shaft to rotate in a forward direction, i.e., rotate in the same direction as the main shaft 20 is rotating. Likewise, if the shifter is moved so that the pto sleeve 71 is engaged with the rear pto gear 77, the pto shaft will rotate in reverse, i.e., rotate in the opposite direction from the rotation of the main shaft 20. Also, if the shifter is moved so that the pto sleeve 71 is in a neutral position and engaged with neither the front nor rear pto gear 75 or 77, the pto shaft will have no power delivered thereto. Also, analysis will show that all gears are always in mesh and that all gears are always rotating at any time the front main shaft 26 is rotating. Therefore, whether the pto shaft is rotating forward or reverse, then the speed of rotation of the pto shaft is entirely independent of the speed the rear main shaft 28 (which is the main output shaft 28) is rotating at, according to a direct drive or underdrive or is in neutral.

Likewise, pto shaft 80 journalled to the housing by suitable housing bearings 82. Also, the pto sleeve 81 is mounted for reciprocation upon the pto splines 83 which is controlled by the pto shifter (not shown). Likewise, the front pto gear 85 is journalled by bearings 86 and the rear pto gear 87 is journalled by the rear pto bearings 88 to the pto shaft 80. The ends of the shaft are splined at 84 which are output connections. Also, it will be understood by those skilled in the art that front pto bearing 85 is meshed with front counter shaft gear 64 and that rear pto gear 87 is meshed with rear main gear 40. Thus, the operation of the two pto shafts is identical but independent. I.e., the operation of each pto shaft is in no way dependent upon whether the other pto shaft is in the neutral, forward or reverse position.

Thus, it may be seen that I have provided a auxiliary transmission or gear box having two pto output shafts, each of which extends both forward and rearwardly of the housing and may be operated and the operation of the gear box is entirely flexible. I.e., the outputs of the main shafts or either the pto shafts are independent of any other type of operation.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| | |
|---|---|
| 10 housing | 62 housing bearing |
| 12 front end plate | 64 front counter shaft gear |
| 14 rear end plate | 66 rear counter shaft gear |
| 20 main shaft | 70 pto shaft |
| 22 housing bearing | 71 pto sleeve |
| 26 front main shaft | 72 housing bearings |
| 28 rear main shaft | 73 pto splines |
| 30 front spline | 74 splined |
| 32 rear spline | 75 front pto gear |
| 34 bushing | 76 front pto bearing |
| 36 stub | 77 rear pto gear |
| 38 front main gear | 78 rear pto bearing |
| 40 rear main gear | 79 pto shifter |
| 42 rear main bearing | 80 pto shaft |
| 44 main sleeve | 81 pto sleeve |
| 46 main spline | 82 housing bearing |
| 48 shifter | 83 pto splines |
| 50 counter shaft | 84 splined |
| 52 housing bearing | 85 front pto gear |
| 54 front counter shaft gear | 86 bearings |
| 56 rear counter shaft gear | 87 rear pto gear |
| 60 counter shaft | 88 rear pto bearing |

I claim as my invention:
1. In a truck auxiliary transmission having
   a. a main input shaft,
   b. a main output shaft coaxial with the main input shaft,
   c. a front gear affixed to the main input shaft,
   d. a rear gear journalled to the main output shaft, e. a slide means on the output shaft for locking the main output shaft to either the front gear or the rear gear or neutral,
f. two counter shafts, each counter shaft having
   (i) a front counter shaft gear meshed with said front main gear, and
   (ii) a rear counter shaft gear meshed with the rear main gear, the improved structure comprising:
g. a pto shaft,
h. a front pto gear meshed with one of the front counter shaft gear and clearing the front main gear, and
j. a rear pto gear both meshed with the rear main gear and clearing both the rear counter shaft gears,
k. both the pto gears journalled to the pto shaft,
m. a pto slide mounted upon a spline upon the pto shaft,
n. said slide being adapted to be moved to a forward position to lock the front pto gear to the pto shaft,
o. said slide also adapted to be moved to a rear position to lock the rear pto gear to the pto shaft,
p. said slide further adapted to be in a neutral position
q. so that the pto shaft may be rotated forward, reverse or neutral with the main output shaft in either direct drive, underdrive or neutral.

2. The invention as defined in claim 1 further comprising:
p. all said gears enclosed in a housing having a front and rear end plate,
q. all said shafts journalled in bearings attached to the front end plate and in bearings attached to the rear end plate.

3. The invention as defined in claim 1 further comprising:
p. splines on each end of the pto shaft for attaching suitable output shafts thereto.

4. The invention as defined in claim 1 further comprising:
p. a second pto shaft with gears and operations as defined above,
q. so that either pto shaft may be rotated forward, reverse or neutral with the other pto in either forward, reverse or neutral.

5. The invention as defined in claim 4 further comprising:
q. splines on each end of the pto shaft for attaching suitable output shafts thereto.

6. The invention as defined in claim 5 further comprising:
r. all said gears enclosed in a housing having a front and rear end plate,
s. all said shafts journalled in bearings attached to the front end plate and in bearings attached to the rear end plate.

* * * * *